US009170604B2

(12) United States Patent
Guo (10) Patent No.: US 9,170,604 B2
(45) Date of Patent: Oct. 27, 2015

(54) KEYBOARD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Ji-Bing Guo, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 222 days.

(21) Appl. No.: 13/776,749

(22) Filed: Feb. 26, 2013

(65) Prior Publication Data

US 2013/0222994 A1    Aug. 29, 2013

(30) Foreign Application Priority Data

Feb. 28, 2012    (CN) .......................... 2012 1 0046956

(51) Int. Cl.
*G06F 1/16* (2006.01)
*G06F 3/02* (2006.01)
(52) U.S. Cl.
CPC ............... *G06F 1/16* (2013.01); *G06F 3/0202* (2013.01)
(58) Field of Classification Search
USPC ............................................. 361/679.14, 732
See application file for complete search history.

(56) References Cited

U.S. PATENT DOCUMENTS

| 4,661,005 | A  | * | 4/1987 | Lahr ............................. 400/489 |
|-----------|----|---|--------|-------------------------------------------|
| 4,739,451 | A  | * | 4/1988 | Kuba ....................... 361/679.08 |
| 5,502,460 | A  | * | 3/1996 | Bowen .......................... 345/168 |
| 5,574,481 | A  | * | 11/1996 | Lee ................................ 345/168 |
| 5,904,327 | A  | * | 5/1999 | Cheng ........................ 248/118.1 |
| 6,266,234 | B1 | * | 7/2001 | Leman ..................... 361/679.11 |
| 7,828,489 | B1 | * | 11/2010 | Hargreaves et al. .......... 400/489 |
| 7,920,123 | B2 | * | 4/2011 | Kawami et al. ............... 345/156 |
| 8,238,084 | B2 | * | 8/2012 | Chen et al. ............... 361/679.14 |
| 2004/0226248 | A1 | * | 11/2004 | Wu ................................. 52/600 |
| 2007/0045392 | A1 | * | 3/2007 | Youens et al. ............ 235/145 R |
| 2009/0188378 | A1 | * | 7/2009 | Folkesson ...................... 84/615 |

* cited by examiner

*Primary Examiner* — Adrian S Wilson
*Assistant Examiner* — Izak Baranowski
(74) *Attorney, Agent, or Firm* — Novak Druce Connolly Bove + Quigg LLP (57) ABSTRACT

A keyboard includes a first keyboard section, a second keyboard section, and a connection structure. The connection structure includes a hook portion, a first operation member, a drive portion, and at least one latch portion. The hook portion, the first operation member, and the drive portion are defined at the first keyboard section, and the at least one latch portion is defined at the second keyboard section. The first operation member is detachably clasped with the hook portion. The drive portion drives the hook portion moving along a first direction to protrude out of the first keyboard section when the first operation member is operated to detach the hook portion. The at least one latch portion is configured for latching with the hook portion to detachably engage the first keyboard section with the second keyboard section.

11 Claims, 9 Drawing Sheets

KEYBOARD

BACKGROUND

1. Technical Field

The disclosure relates to peripherals of computing devices, and more particularly to a keyboard.

2. Description of Related Art

Keyboards are important input/output (I/O) devices of computing systems, such as desktop computers and even portable computers. Under some particular conditions, two or more people may simultaneously operate one keyboard. For example, two users may play two player games using the same keyboard. However, due to the dimensions and configuration of the traditional keyboards, it is inconvenient for multiple people to operate the same keyboard simultaneously. Therefore, there is room for improvement in the art.

BRIEF DESCRIPTION OF THE DRAWINGS

The accompanying drawings are included to provide a further understanding of the disclosure, and are incorporated in and constitute a part of this application. The drawings illustrate embodiments of the disclosure and, together with the description, serve to explain the principles of the disclosure.

DETAILED DESCRIPTION

Examples of the present embodiments are illustrated in the accompanying drawings. Wherever possible, the same or similar reference numbers are used, in the drawings and the description, to refer to the same or like parts.

Figure 1:
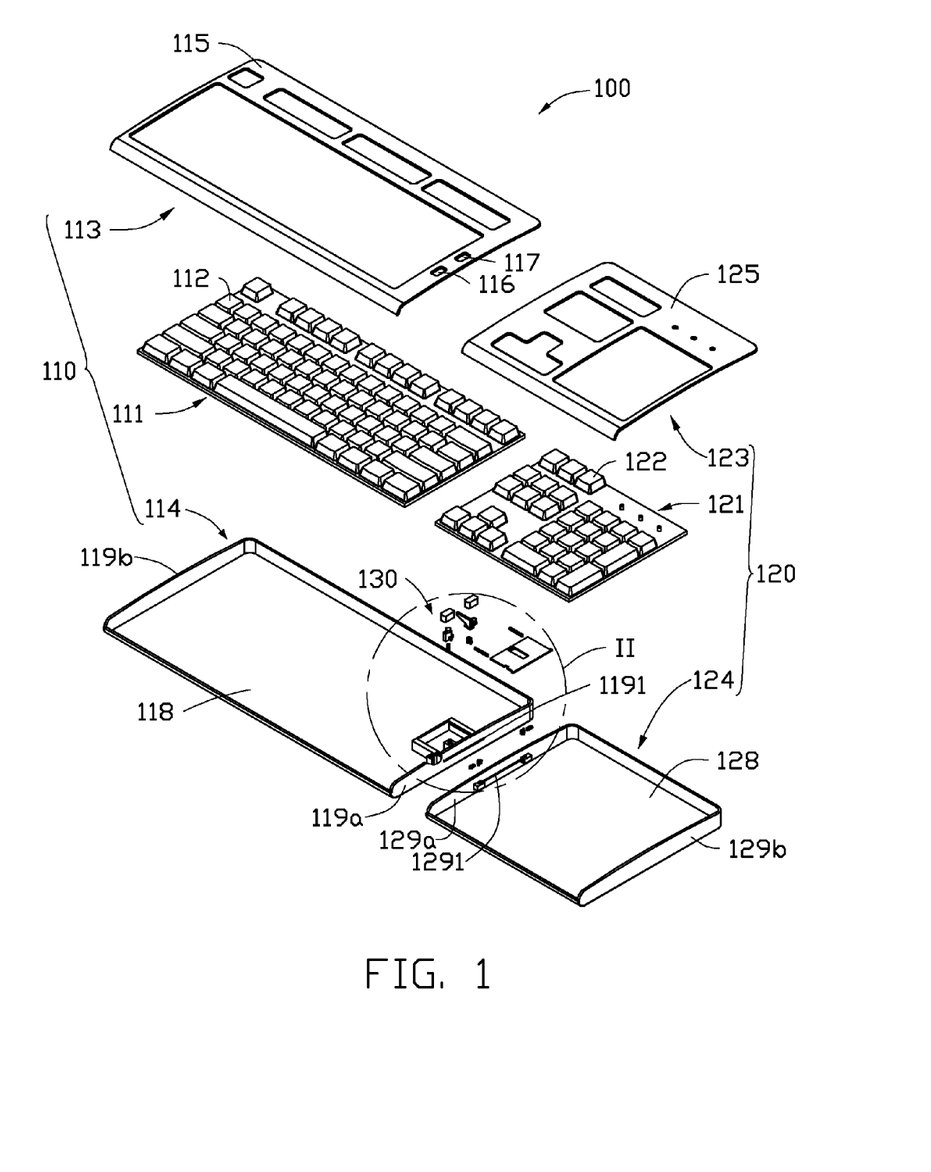
FIG. 1 is an exploded view of a keyboard illustrating one embodiment of the present disclosure, the keyboard including a first keyboard section, a second keyboard section, and a connection structure.

FIG. 1 shows one embodiment of a keyboard 100 of the present disclosure. The keyboard 100 includes a first keyboard section 110, a second keyboard section 120, and a connection structure 130. The first keyboard section 110 and the second keyboard section 120 are detachably engaged together by the connection structure 130. After the first keyboard section 110 and the second keyboard section 120 are engaged together, the connection structure 130 can be operated to detach the first keyboard section 110 and the second keyboard section 120 from each other. The first keyboard section 110 cooperates with the second keyboard section 120 to form a complete keyboard.

The first keyboard section 110 includes a first button portion 111, a first upper shell 113, and a first lower shell 114. The first button portion 111 includes a plurality of buttons 112. The first upper shell 113 is clasped with the first lower shell 114 to fix the first button portion 111 therebetween. The first upper shell 113 defines a first top base 115 having a plurality of openings (not labeled). The plurality of buttons 112 protrude from the first upper shell 113 through the openings of the first top base 115. The first top base 115 further includes a first through hole 116 and a second through hole 117 defined on one side. The first lower shell 114 includes a first bottom base 118 and first sidewalls (e.g., 119a and 119b) extending from the first bottom base 118 to the first top base 115. The first sidewall 119a adjacent to the second keyboard section 120 defines a first opening 1191.

The second keyboard section 120 includes a second button portion 121, a second upper shell 123, and a second lower shell 124. The second button portion 121 includes a plurality of buttons 122. The second upper shell 123 is clasped with the second lower shell 124 to fixedly sandwich the second button portion 121. The second upper shell 123 defines a second top base 125 having a plurality of openings (not labeled). The plurality of buttons 122 protrude from the second upper shell 123 through the openings of the second top base 125. The second lower shell 124 includes a second bottom base 128 and second sidewalls (e.g., 129a and 129b) extending from the second bottom base 128 to the second top base 125. The second sidewall 129a adjacent to first sidewall 119a of the first keyboard section 110 defines a second opening 1291 corresponding to the first opening 1191.

Figure 2:
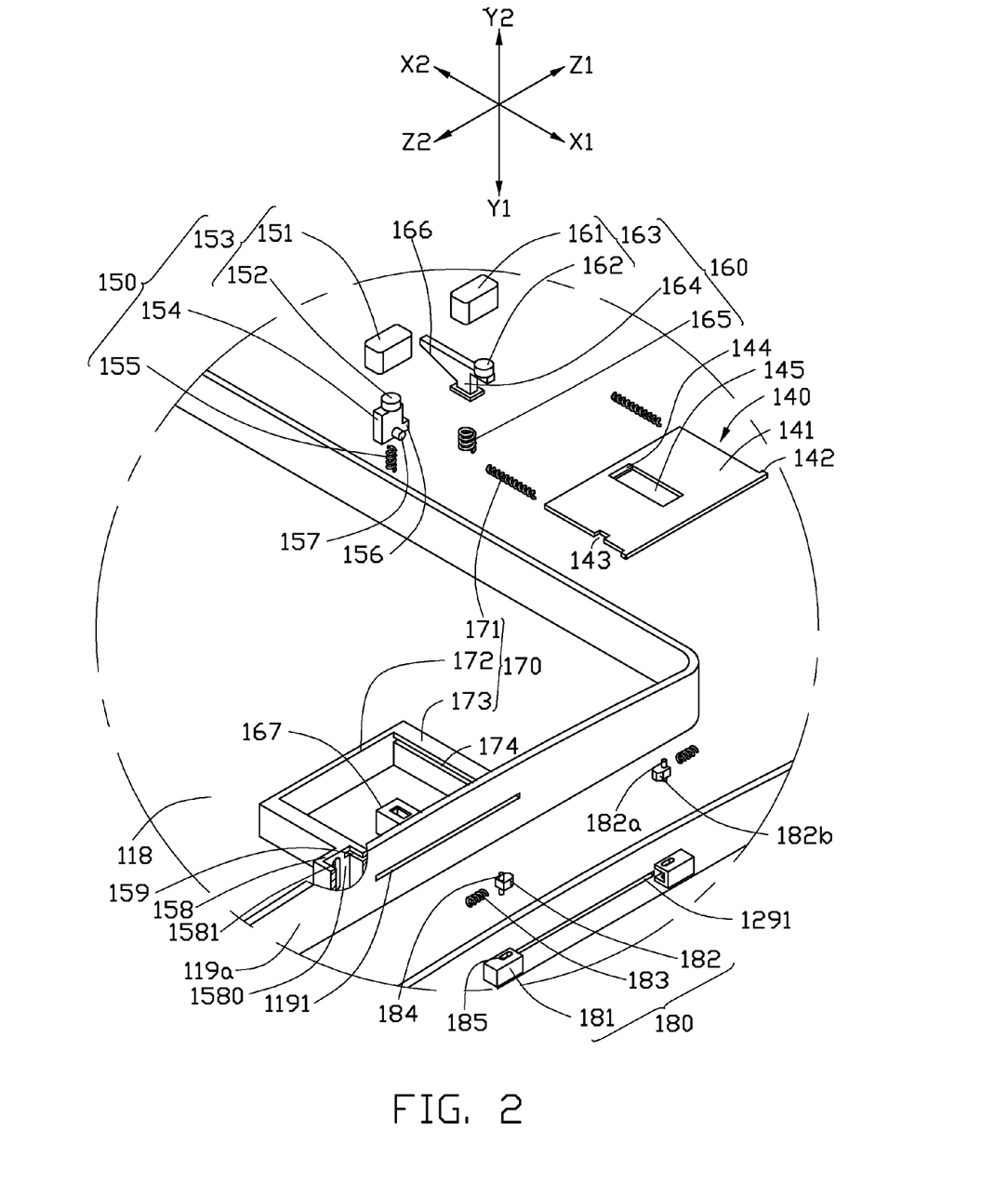
FIG. 2 is an enlarged exploded view of the connection structure of FIG. 1.
Figure 3:
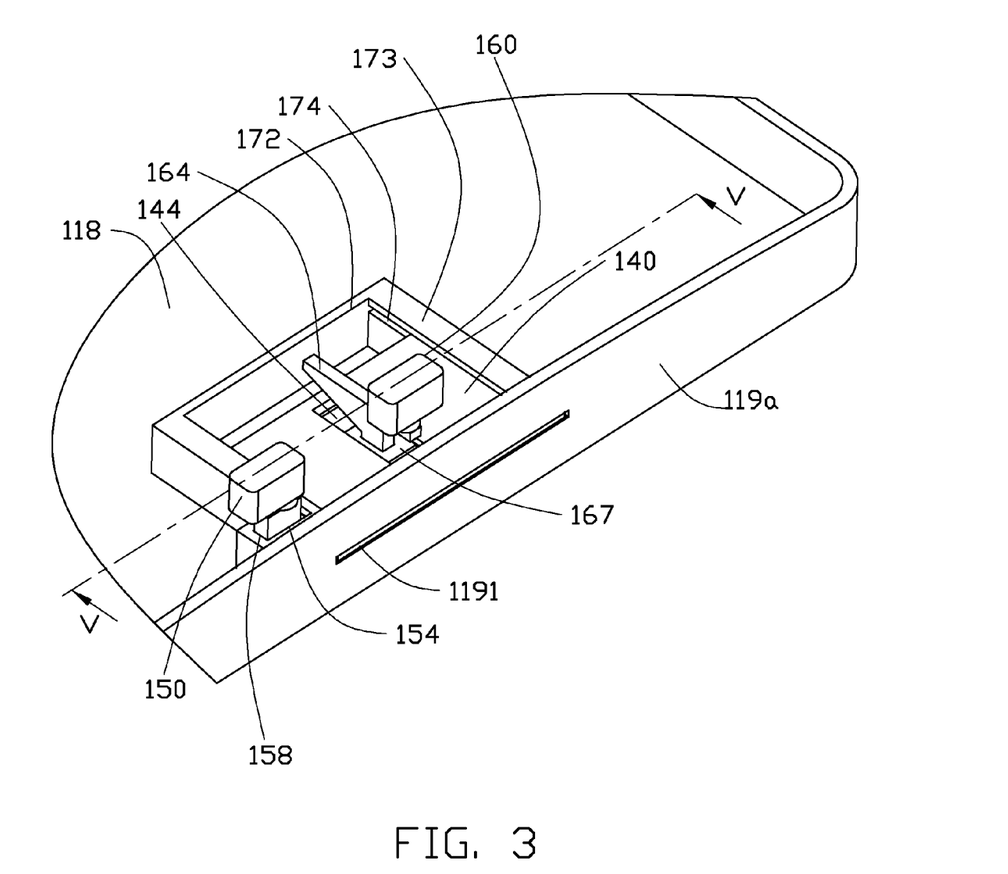
FIG. 3 and FIG. 4 are partial schematic views of the first keyboard section of FIG. 2 under different states.
Figure 4:
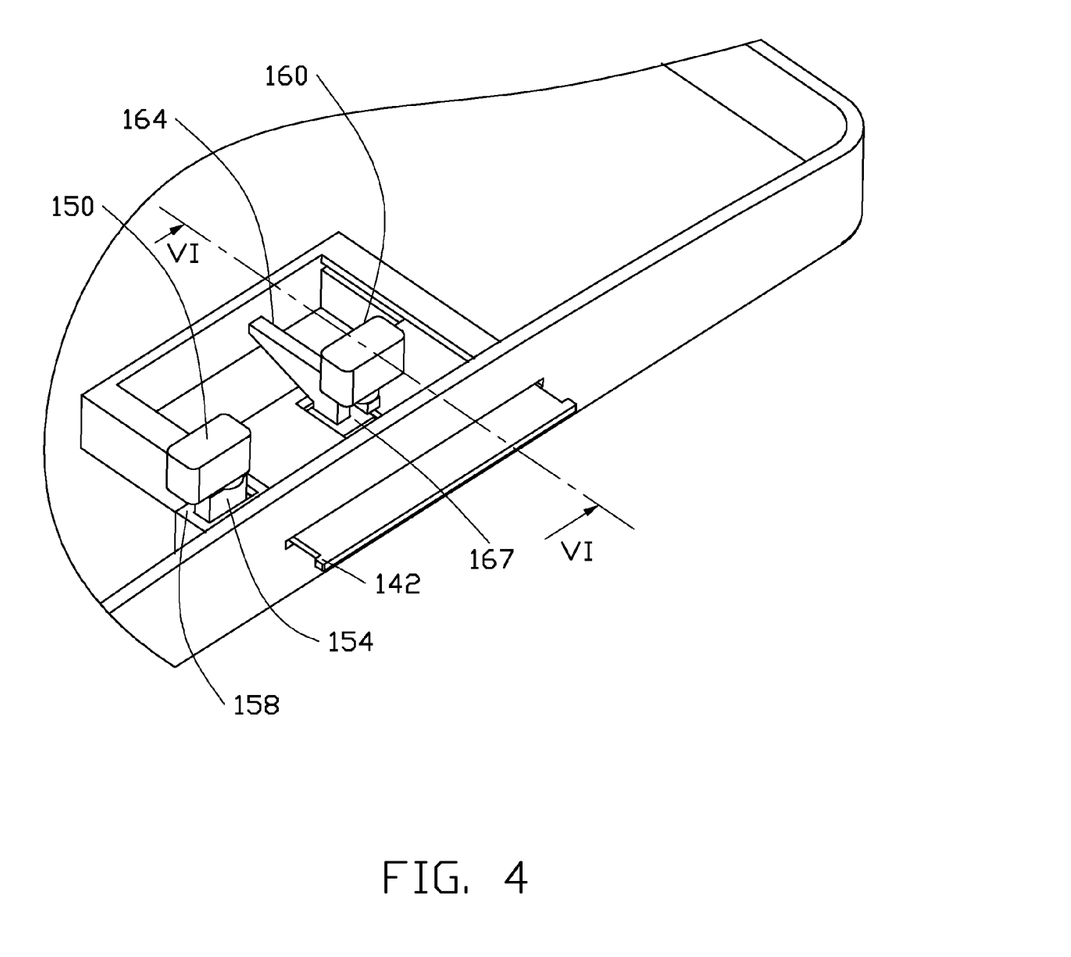

FIGS. 2-4 show that the connection structure 130 includes a hook portion 140, a first operation member 150, a second operation member 160, a drive portion 170, and at least one latch portion 180. The hook portion 140, the first operation member 150, the second operation member 160, and the drive portion 170 are located in the first keyboard section 110. The at least one latch portion 180 is located in the second keyboard section 120. It should be understood that, in other embodiments, the hook portion 140, the first operation member 150, the second operation member 160, and the drive portion 170 can be located in the second keyboard section 120, and the at least one latch portion 180 can be located in the first keyboard section 110.

The first operation member 150 is capable of being clasped with the hook portion 140. When the first operation member 150 is clasped with the hook portion 140, as shown in FIG. 3, the hook portion 140 is located within the first keyboard section 110. In addition, the first operation member 150 protrudes out of the first top base 115 through the first through hole 116, to facilitate operation of a user. When the first operation member 150 is operated (e.g., is pressed) the first operation member 150 is detached from the hook portion 140. At this time, the drive portion 170 drives the hook portion 140 moving along a first direction X1 and passing through the first opening 1191 to protrude out of the first keyboard section 110, as shown in FIG. 4.

The second operation member 160 protrudes out of the first top base 115 through the second through hole 117. The second operation member 160 drives the hook portion 140 moving along a second direction X2 reverse to the first direction X1 when the second operation member 160 is operated upon the condition that the first operation portion 150 and the hook portion 140 are detached from each other, thereby drawing back the hook portion 140 into the first keyboard section 110. When the hook portion 140 is drawn back into the first keyboard section 110, the first operation member 150 is clasped to the hook portion 140. In this embodiment, the first direction X1 is a horizontal direction that is parallel to the first keyboard section 110 and the second keyboard section 120.

Figure 5:
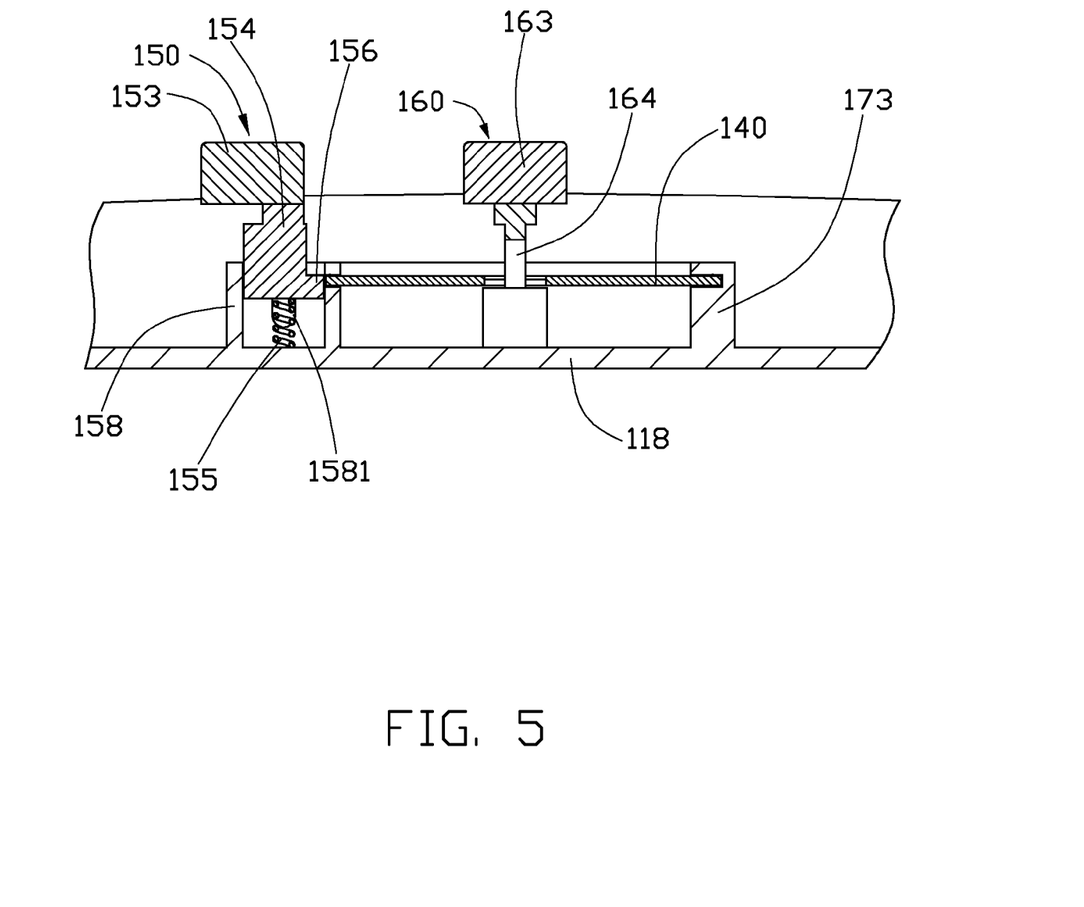
FIG. 5 is a cross-sectional view of the first keyboard section taken along line V-V of FIG. 3.
Figure 6:
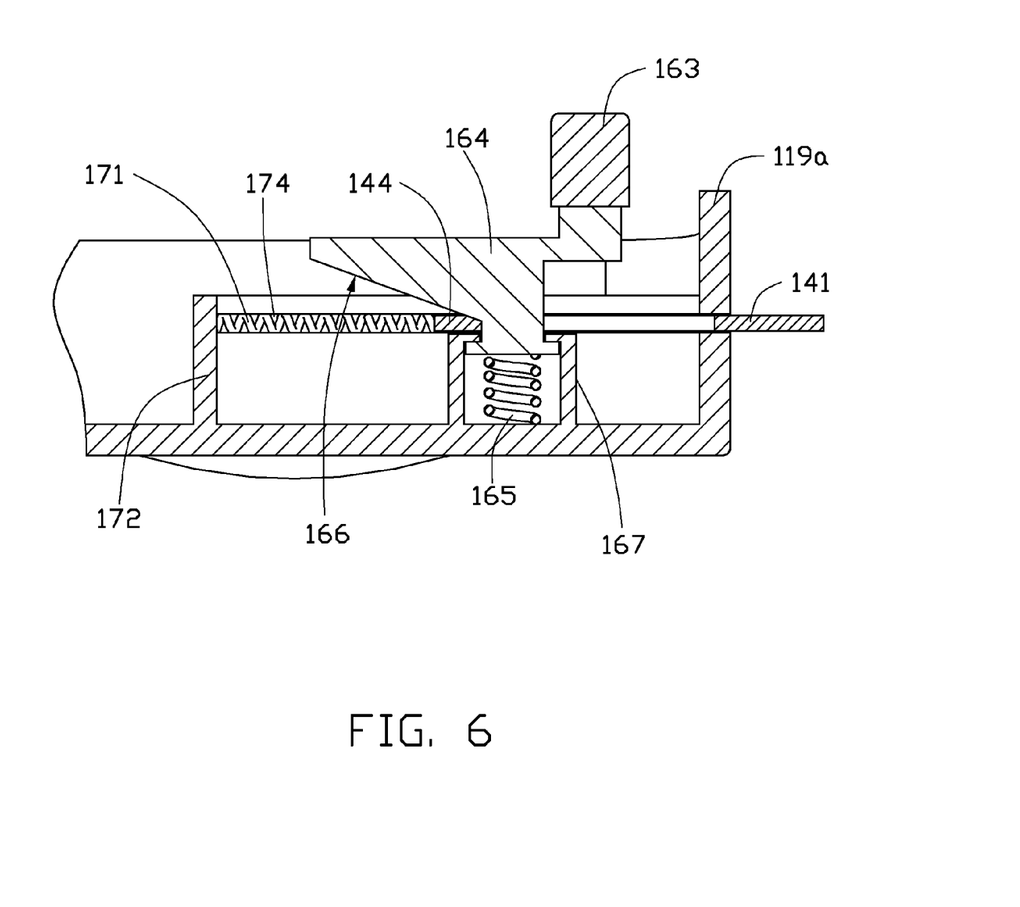
FIG. 6 is a cross-sectional view of the first keyboard section taken along line VI-VI of FIG. 4.

FIG. 5 is a cross-sectional view of the first keyboard section 110 taken along line V-V of FIG. 3, FIG. 6 is a cross-sectional view of the first keyboard section 110 taken along line VI-VI of FIG. 4. The first operation member 150 includes a first operation portion 153, a stopping portion 154 connected to the first operation portion 153, and a first elastic element 155. The first operation portion 153 protrudes out of the first keyboard section 110 through the first through hole 116. As shown in FIG. 2, the first operation portion 153 includes a first button 152 and a first button shell 151 that sleeves the first button 152. The stopping portion 154 includes a stopping end 156 protruding from a side of the stopping portion 154. The first elastic element 155 is arranged between the stopping portion 154 and the first bottom base 118. The stopping portion 154 is clasped with the hook portion 140 when the first keyboard section 110 is fixed to the second keyboard section 120. When the first operation portion 153 is operated, the first operation portion 153 drives the stopping portion 154 moving along a third direction Y1 that is perpendicular to the first bottom base 118, to detach the stopping portion 154 from the hook portion 140. At the same time, the stopping portion 154 compresses the first elastic element 155.

In this embodiment, the first bottom base 118 defines a first guide portion 158 corresponding to the first elastic element 155. The first guide portion 158 guides the stopping portion 154 to move along the third direction Y1 or move along a fourth direction Y2 reverse to the third direction Y1. The first guide portion 158 includes at least one guide wall 1580 extending from the first bottom base 118 to the first upper shell 113. The at least one guide wall 1580 and the first bottom base 118 corporately define a first receiving space (not labeled) to receive the first elastic element 155 and the stopping portion 154. The first guide portion 158 further defines a gap 159 on the at least one guide wall 1580, so that the hook portion 140 is capable of extending into the gap 159. In addition, the stopping portion 154 further includes a limitation pole 157 perpendicularly extending towards the first sidewall 119a, and the first guide portion 158 further includes a limitation notch 1581 corresponding to the limitation pole 157. The limitation pole 157 is capable of moving within the limitation notch 1581 to limit the position of the stopping portion 154.

The drive portion 170 includes a second elastic element 171, a positioning wall 172, and a second guide portion 173. The positioning wall 172 extends from the first bottom base 118 and is parallel to the first sidewall 119a. One end of the second elastic element 171 resists the positioning wall 172, and another end connects to the hook portion 140. The second guide portion 173 is perpendicularly connected between the positioning wall 172 and the first sidewall 119a. The second guide portion 173 further defines a slide groove 174 to receive the second elastic element 171.

The hook portion 140 includes a main body 141. One side of the main body 141 defines at least one hook 142, and another opposite side of the main body 141 is connected to the second elastic element 171. The main body 141 further includes a limitation portion 143 and a forced portion 144. The limitation portion 143 is clasped and coupled to the stopping end 156 to fix the hook portion 140. The forced portion 144 can be forced by the second operation member 160 to drive the hook portion 140 moving along the second direction X2.

In the embodiment, the hook portion 140 is plate shaped and parallel to the first bottom base 118, which is capable of sliding along the gap 159. The limitation portion 143 is a cutout defined at a side of the main body 141. When the stopping portion 154 is detached from the limitation portion 143, the stopping end 156 is positioned under the main body 141 and compresses the first elastic element 155. Thus, when the second operation member 160 is operated, the hook portion 140 is driven to move along the second direction X2, so as to make the stopping end 156 align with the limitation portion 143. At this time, the stopping portion 154 is driven by the first elastic element 155 to clasp with the limitation portion 143, and the hook portion 140 is drawn back into the first keyboard section 110. The hook portion 140 further defines a notch 145 centered at the main body 141. The forced portion 144 is defined to be a bevel at a side of the notch 145, which is inclined to the first bottom base 118.

The second operation member 160 includes a second operation portion 163, a slide block 164, and a third elastic element 165. The second operation portion 163 protrudes out of the first keyboard section 110 through the second through hole 117. The second operation portion 163 includes a second button 162 and a second button shell 161 that sleeves the second button 162. The third elastic element 165 is arranged between the slide block 164 and the first bottom base 118, and resists the slide block 164 and the first bottom base 118. The slide block 164 is arranged between the second operation portion 163 and the third elastic element 165. The slide block 164 includes an inclined surface 166 inclined to the first bottom base 118.

When the second operation member 160 is operated, the slide block 164 is driven to move along the third direction Y1. At this time, the inclined surface 166 resists the forced portion 144 and pushes the hook portion 140 to slide along the second direction X2, thereby clasping the stopping portion 154 of the first operation member 150 to the limitation portion 143 of the hook portion 140. In this embodiment, the second operation member 160 passes through the notch 145 to resist the first bottom base 118. The first bottom base 118 further defines a third guide portion 167 configured for guiding the second operation member 160 to move vertically along the third direction Y1 or the fourth direction Y2.

The at least one latch portion 180 is defined at an internal side of the second sidewall 129a. The at least one hook 142 of the hook portion 140 is capable of passing through the second opening 1291 to latch with the at least one latch portion 180. The at least one latch portion 180 includes a securing member 181, a limitation block 182, and a fourth elastic element 183. The fourth elastic element 183 is arranged between the securing member 181 and the limitation block 182. One end of the fourth elastic element 183 resists the securing member 181, and another opposite end of the fourth elastic element 183 resists the limitation block 182. The securing member 181 and the second sidewall 129a corporately define a second receiving space to receive the fourth elastic element 183. The limitation block 182 is U-shaped and defines a first arcuate surface 182a and a second arcuate surface 182b opposite to the first arcuate surface 182a. The limitation block 182 further includes a vertical limitation rod 184, and the securing member 181 further includes a limitation groove 185. The vertical limitation rod 184 protrudes out of the second receiving space and is capable of moving within the limitation groove 185.

Figure 7:
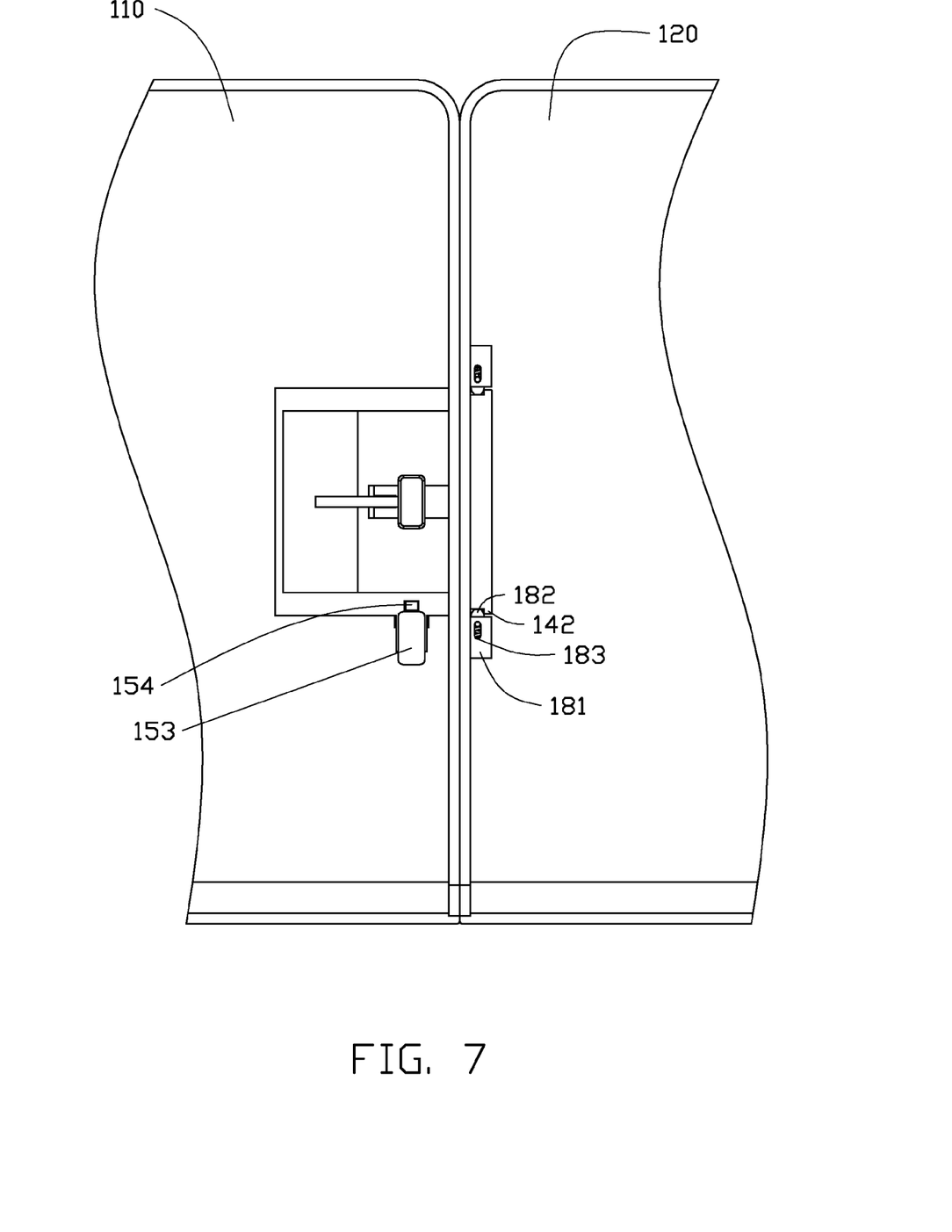
FIG. 7 is a schematic view showing assembles of the first keyboard section and the second keyboard section of FIG. 1.

FIG. 7 is a schematic view of the keyboard 100 showing the at least one latch portion 180 latched with the hook portion 140. In this embodiment, when the hook portion 140 passes through the second opening 1291, the at least one hook 142 first contacts the first arcuate surface 182a, and then pushes the limitation block 182 to move along a fifth direction Z1, thereby compressing the fourth elastic element 183 to a certain of deformation. The hook portion 140 is moved to a position where the at least one hook 142 makes contact with the second arcuate surface 182b. Then, the fourth elastic element 183 is restored to its original state and drives the limitation block 182 to move along a sixth direction Z2 until the limitation block 182 is latched with the at least one hook 142 of the hook portion 140. The limitation rod 184 cooperates with the limitation groove 185 to limit the movement of the limitation block 182. In the embodiment, the fifth direction Z1 is reverse to the sixth direction Z2, and is perpendicular to the first direction X1 and the second direction X2.

Figure 8:
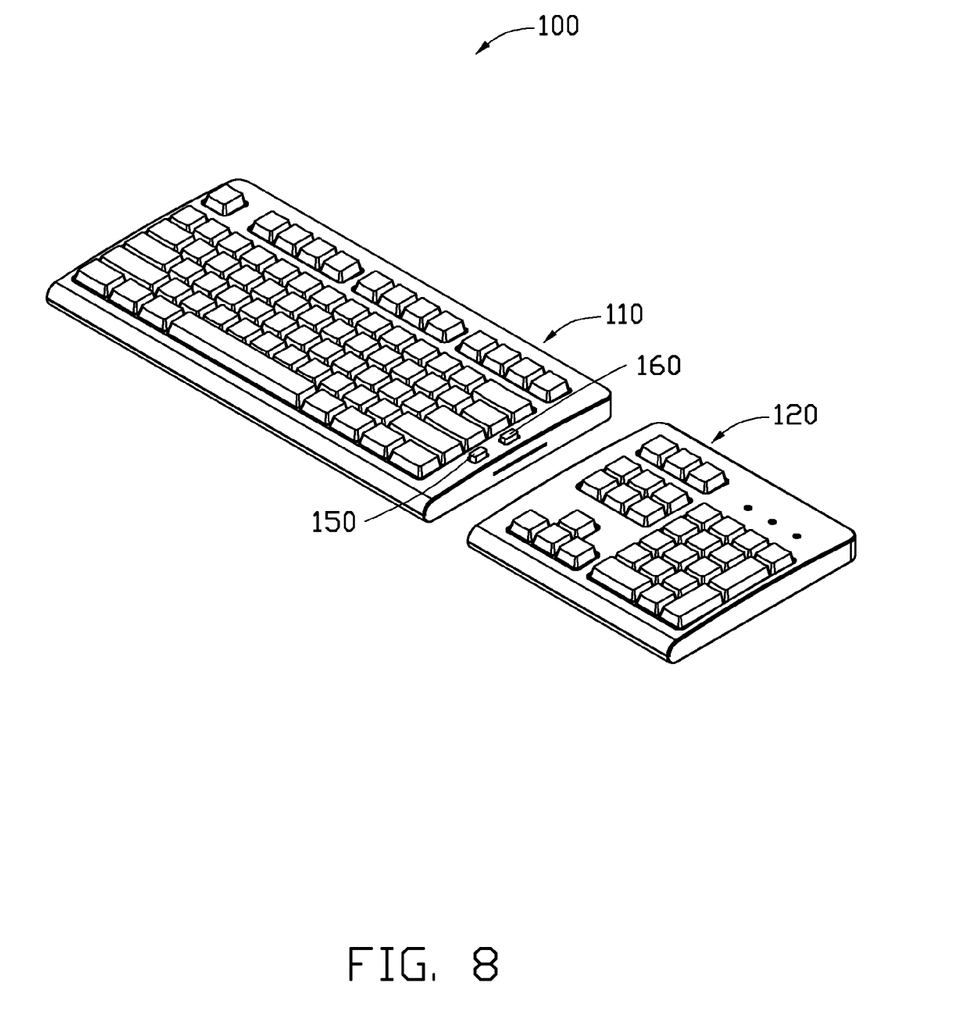
FIG. 8 shows a schematic view of the keyboard when the first keyboard section and the second keyboard section are detached from each other.
Figure 9:
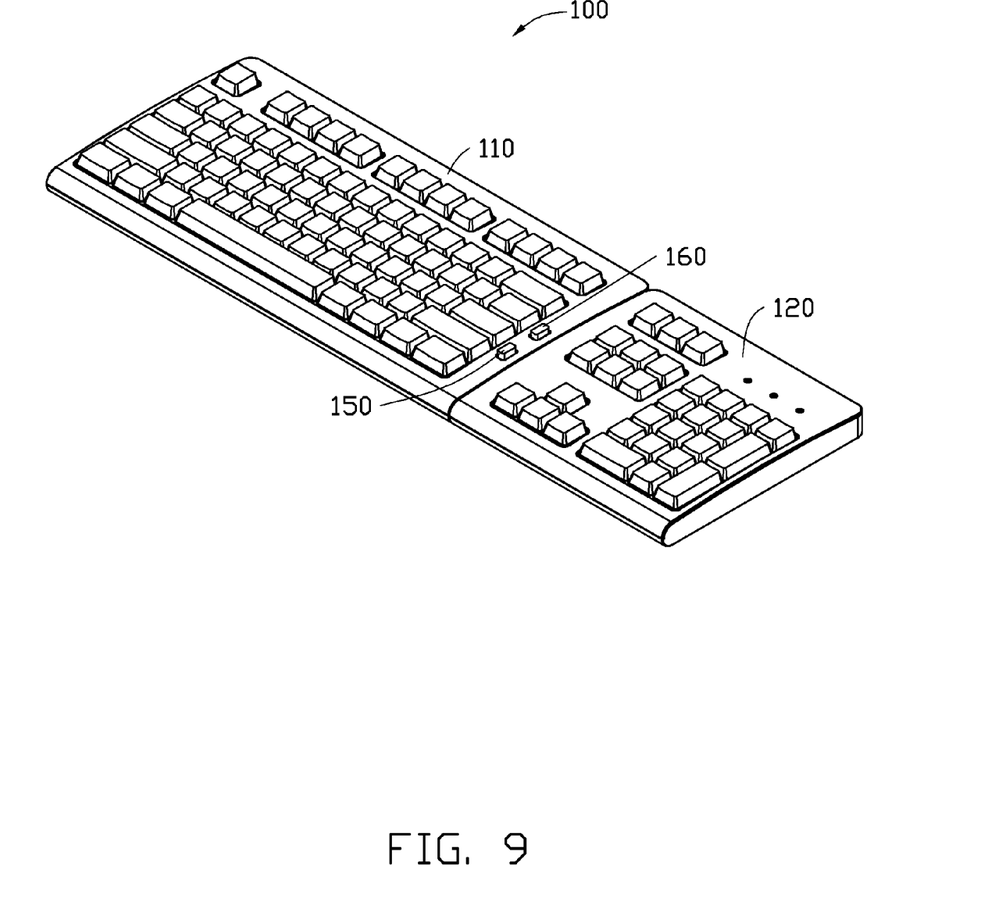
FIG. 9 shows an assembled view of the keyboard when the first keyboard section and the second keyboard section are assembled together.

FIG. 8 illustrates a schematic view of the keyboard 100 when the first keyboard section 110 and the second keyboard section 120 are detached from each other, FIG. 9 illustrates an assembled view of the keyboard 100 when the first keyboard section 110 and the second keyboard section 120 are assembled together. As shown in FIG. 8, when the first keyboard section 110 and the second keyboard section 120 are detached from each other, the hook portion 140 is received within the first keyboard section 110 through the first opening 1191. At this time, the stopping portion 154 of the first operation member 150 is clasped with the limitation portion 143 of the hook portion 140, and the second elastic element 171 is clamped by the positioning wall 172 and the hook portion 140 within the gap 174. Both the first keyboard section 110 and the second keyboard section 120 can be independently used as an input device.

FIG. 5 and FIG. 7 as well show when the first keyboard section 110 and the second keyboard section 120 need to be assembled together, the first operation portion 153 is pressed to drive the stopping portion 154 to move along the third direction Y1. The first elastic element 155 is compressed and clamped between the stopping portion 154 and the first bottom base 118, and the stopping end 156 is detached from the limitation portion 143. At the same time, the second elastic element 171 is released to drive the hook portion 140 to pass through the first opening 1191 and protrude out of the first keyboard section 110 along the first direction X1. Then, the hook portion 140 is pushed to pass through the second opening 1291. The at least one hook 142 of the hook portion 140 first contacts the first arcuate surface 182a (see FIG. 2) pushing the limitation block 182 to compress the fourth elastic element 183 along the fifth direction Z1 and move toward the second receiving space. At the same time, the fourth elastic element 183 is compressed and has a certain of deformation. Thereupon, when the hook portion 140 moves to a position where the at least one hook 142 contacts with the second arcuate surface 182b, the fourth elastic element 183 is restored to its original state and drives the limitation block 182 to move along the sixth direction Z2 until the limitation block 182 latches with the at least one hook 142. At this time, as shown in FIG. 9, the first keyboard section 110 and the second keyboard section 120 are assembled together to form the keyboard 100.

FIG. 7 shows when the keyboard 100 needs to be disassembled, the first keyboard section 110 is pulled to move relative to the second keyboard section 120 along the first direction X1, or the second keyboard section 120 is pulled to move relative to the first keyboard section 110 along the second direction X2. Then, the hook portion 140 contacts the second arcuate surface 182b and pushes the limitation block 182 to compress the fourth elastic element 183 along the fifth direction Z1 and move toward the second receiving space. When the hook portion 140 moves to a position where the at least one hook 142 contacts with the first arcuate surface 182a, the fourth elastic element 183 is restored to its original state and drives the limitation block 182 to move along the sixth direction Z2. At this time, the at least one hook 142 is detached from the limitation block 182, and the first keyboard section 110 is detached from the second keyboard section 120, but the at least one hook 142 of the hook portion 140 is protruding out of the first keyboard section 110 as shown in FIG. 4.

FIG. 6 shows that in order to receive the at least one hook 142 of the hook portion 140 within the first keyboard section 110, the second operation portion 163 is pressed to drive the slide block 164 to slide along the third direction Y1. The third elastic element 165 is compressed and clamped between the slide block 164 and the first bottom base 118. The inclined surface 166 resists and forces the forced portion 144 to move relative to the inclined surface 166, thereby driving the hook portion 140 to move and compress the second elastic element 171 along the second direction X2. When the limitation portion 143 moves to a position where the stopping end 156 is aimed at the limitation portion 143, the third elastic element 165 is released to drive the stopping portion 150 to move along the fourth direction Y2 until the stopping end 156 is latched with the limitation portion 143, and the first operation portion 153 is driven by the third elastic element 165 to return its original position. At this time, the hook portion 140 is totally received in the first keyboard section 110, and the keyboard 100 is disassembled to the state of FIG. 8.

In summary, the keyboard 100 of the present disclosure includes the first keyboard section 110 and the second keyboard section 120. When different users need to simultaneously use the keyboard section 110, the first keyboard section 110 and the second keyboard section 120 can be detached from each other, thereby facilitating operation. Furthermore, if any of the first keyboard section 110 and the second keyboard section 120 is not needed, it can be put away to save desk space where the keyboard 100 is located.

Although numerous characteristics and advantages of the present embodiments have been set out in the foregoing description, together with details of the structures and functions of the embodiments, the disclosure is illustrative only; and changes may be made in detail, especially in the matters of shape, size and arrangement of parts within the principles of the disclosure to the full extent indicated by the broad general meaning of the terms in which the appended claims are expressed.

What is claimed is:

1. A keyboard, comprising a first keyboard section, a second keyboard section, and a connection structure, the connection structure configured for detachably connecting the first keyboard section and the second keyboard section, the connection structure comprising a hook portion, a first operation member, a drive portion, and at least one latch portion;

wherein the hook portion, the first operation member, and the drive portion are defined at the first keyboard section, the at least one latch portion is defined at the second keyboard section, the first operation member is detachably clasped with the hook portion, the drive portion drives the hook portion to move along a first direction to protrude out of the first keyboard section when the first operation member is operated along a direction perpendicular to the first direction to detach the hook portion, and the at least one latch portion is configured for latching with the hook portion to detachably engage the first keyboard section with the second keyboard section, when the first keyboard section is detached with the second keyboard section, the first keyboard section and the second keyboard section respectively serve as an individual input device;

wherein the first operation member comprises a first operation portion and a stopping portion connected to the first operation portion, the hook portion comprises a limitation portion configured for clasping the stopping portion, when the first operation portion is operated, the stopping portion detaches from the limitation portion and the hook portion is driven by the drive portion to move along the first direction;

wherein the first keyboard section comprises a first button portion, and a first upper shell and a first lower shell, the first upper shell and the first lower shell are clasped with each other to fix the first button portion and receive the hook portion, the first operation member, and the drive portion therebetween, the first upper shell comprises a first through hole, the first lower shell comprises a first bottom base and a first sidewall adjacent to the second keyboard section, the first operation portion protrudes out of the first upper shell through the first through hole, and the first operation member further comprises a first elastic element positioned between the stopping portion and the first bottom base;

wherein the first bottom base further defines a first guide portion corresponding to the first elastic element, the first guide portion guiding the stopping portion to move along a vertical direction perpendicular to the first bottom base.

2. A keyboard, comprising a first keyboard section, a second keyboard section, and a connection structure, the connection structure configured for detachably connecting the first keyboard section and the second keyboard section, the connection structure comprising a hook portion, a first operation member, a drive portion, and at least one latch portion;

wherein the hook portion, the first operation member, and the drive portion are defined at the first keyboard section, the at least one latch portion is defined at the second keyboard section, the first operation member is detachably clasped with the hook portion, the drive portion drives the hook portion to move along a first direction to protrude out of the first keyboard section when the first operation member is operated along a direction perpendicular to the first direction to detach the hook portion, and the at least one latch portion is configured for latching with the hook portion to detachably engage the first keyboard section with the second keyboard section, when the first keyboard section is detached with the second keyboard section, the first keyboard section and the second keyboard section respectively serve as an individual input device;

wherein the first operation member comprises a first operation portion and a stopping portion connected to the first operation portion, the hook portion comprises a limitation portion configured for clasping the stopping portion, when the first operation portion is operated, the stopping portion detaches from the limitation portion and the hook portion is driven by the drive portion to move along the first direction;

wherein the first keyboard section comprises a first button portion, and a first upper shell and a first lower shell, the first upper shell and the first lower shell are clasped with each other to fix the first button portion and receive the hook portion, the first operation member, and the drive portion therebetween, the first upper shell comprises a first through hole, the first lower shell comprises a first bottom base and a first sidewall adjacent to the second keyboard section, the first operation portion protrudes out of the first upper shell through the first through hole, and the first operation member further comprises a first elastic element positioned between the stopping portion and the first bottom base;

wherein the drive portion includes a second elastic element and a positioning wall, the positioning wall extends from the first bottom base and is parallel to the first sidewall, one end of the second elastic element resists the positioning wall, and another end connects to the hook portion.

3. The keyboard according to claim 2, wherein the drive portion further comprises a second guide portion configured for guiding the hook portion to move along the first direction, and the second guide portion is perpendicularly connected between the positioning wall and the first sidewall.

4. The keyboard according to claim 2, the connection structure further comprises a second operation member defined at the first keyboard section, when the stopping portion of the first operation member is detached from the limitation portion of the hook portion, the second operation member is configured for driving the hook portion to move along a second direction reverse to the first direction, thereby driving the hook portion to move into the first keyboard section, and at this time, the stopping portion is clasped with the limitation portion.

5. The keyboard according to claim 4, wherein the hook portion further comprises a main body, the limitation portion is defined to be a cutout defined at a side of the main body, another adjacent side of the main body connects to the second elastic element, the main body further defines a forced portion, and the second operation member applies a force to the forced portion to drive the hook portion to move along the second direction.

6. The keyboard according to claim 5, wherein the second operation member comprises a second operation portion, a slide block, and a third elastic element, the third elastic element is arranged between the slide block and the first bottom base, one end of the third elastic element resists the slide block, another end resists the first bottom base, the slide block is arranged between the second operation portion and the third elastic element, the slide block includes an inclined surface that is inclined to the first bottom base, when the second operation member is operated, the slide block is driven to move vertically along a third direction perpendicular to the first bottom base, and the inclined surface resists the forced portion and pushes the hook portion to slide along the second direction, thereby clasping the stopping portion of the first operation member to the limitation portion of the hook portion.

7. The keyboard according to claim 6, wherein the stopping portion further comprises a stopping end corresponding to the limitation portion, when the hook portion is forced to move to a position where the stopping end is align with the limitation portion, the third elastic element is released to drive the stopping portion to move along a fourth direction reverse to the third direction until the stopping end is latched with the limitation portion.

8. The keyboard according to claim 6, wherein the forced portion is a bevel corresponding to coupled with the inclined surface.

9. The keyboard according to claim 6, wherein the first bottom base further defines a third guide portion configured for guiding the second operation member to move along the vertical direction, the hook portion further defines a notch centered at the main body, the forced portion is defined at a side of the notch, and the second operation member passes through the notch to resist the first bottom base.

10. The keyboard according to claim 1, wherein the first guide portion further comprises at least one guide wall and a gap defined on the at least one guide wall, the at least one guide wall and the first bottom base cooperatively define a receiving space to receive the first elastic element and the stopping portion, the hook portion is capable of slide along the gap.

11. A keyboard, comprising a first keyboard section, a second keyboard section, and a connection structure, the connection structure configured for detachably connecting the first keyboard section and the second keyboard section, the connection structure comprising a hook portion, a first operation member, a drive portion, and at least one latch portion;

wherein the hook portion, the first operation member, and the drive portion are defined at the first keyboard section, the at least one latch portion is defined at the second keyboard section, the first operation member is detachably clasped with the hook portion, the drive portion drives the hook portion to move along a first direction to protrude out of the first keyboard section when the first operation member is operated along a direction perpendicular to the first direction to detach the hook portion, and the at least one latch portion is configured for latching with the hook portion to detachably engage the first keyboard section with the second keyboard section, when the first keyboard section is detached with the second keyboard section, the first keyboard section and the second keyboard section respectively serve as an individual input device;

wherein the second keyboard section comprises a second button portion, a second upper shell, and a second lower shell, the second upper shell and the second lower shell are clasped with each other to fix the second button portion and receive the at least one latch portion therebetween, the second lower shell comprises a second bottom base and a second sidewall adjacent to the first keyboard section, the second sidewall defines a second opening, the at least one latch portion is defined at an internal side of the second sidewall, and the hook portion is capable of passing through the second opening to latch with the at least one latch portion, thereby engaging the first keyboard section and the second keyboard section with each other;

wherein the hook portion further defines at least one hook, the at least one latch portion comprises a securing member, a limitation block, and a fourth elastic element, the fourth elastic element is arranged between the securing member and the limitation block, one end of the fourth elastic element resists the securing member, and another opposite end of the fourth elastic element resists the limitation block, the limitation block is U-shaped and defines a first arcuate surface and a second arcuate surface opposite to the first arcuate surface, the at least one hook contacts the first arcuate surface and pushes the limitation block to move and compress the fourth elastic element along a fifth direction perpendicular to the first direction when the hook portion passes through the second opening, and the fourth elastic element is restored to its original state and drives the limitation block moving along a sixth direction reverse to the fifth direction until the limitation block is latched with the at least one hook when the hook portion is moved to a position where the at least one hook makes contact with the second arcuate surface.

* * * * *